United States Patent [19]

McAdams, Jr. et al.

[11] 3,740,624
[45] June 19, 1973

[54] MONOLITHIC CAPACITOR HAVING CORNER INTERNAL ELECTRODE TERMINATIONS

[75] Inventors: Arthur C. McAdams, Jr.; Vincent A. Tomaselli, both of Wichita Falls, Tex.

[73] Assignee: Sprague Electric Company, North Adams, Mass.

[22] Filed: June 21, 1972

[21] Appl. No.: 265,070

[52] U.S. Cl. ............................ 317/258, 317/261
[51] Int. Cl. ............................................. H01g 1/14
[58] Field of Search ........................... 317/258, 261

[56] References Cited
UNITED STATES PATENTS
3,118,095  1/1964  Baron ............................ 317/261

Primary Examiner—E. A. Goldberg
Attorney—Vincent H. Sweeney

[57] ABSTRACT

A monolithic ceramic capacitor has its alternate internal electrodes terminating in opposite corners of the ceramic chip, so as to facilitate the application of external metal terminations by automatic metallizing equipment. This internal electrode arrangement, especially useful in a square-shaped ceramic chip, eliminates the need for chip orientation prior to the introduction of the chip to automatic metallizing equipment. The finished chip, when metallized in either of the two possible orientations, is physically and electrically identical.

4 Claims, 6 Drawing Figures

Patented June 19, 1973 3,740,624

MONOLITHIC CAPACITOR HAVING CORNER INTERNAL ELECTRODE TERMINATIONS

BACKGROUND OF THE INVENTION

This invention relates to monolithic capacitors having corner electrode terminations, and more particularly to a monolithic ceramic capacitor having internal electrodes terminating in opposite corners of the capacitor unit that facilitate processing through automatic silvering equipment.

Monolithic ceramic capacitors have long been used in the industry and are made by stacking alternate layers of a ceramic dielectric material with conductive metal internal electrodes. There internal electrodes have historically been made to have alternate electrode layers terminate at opposite edges of the ceramic unit. The opposite edges of the thusly formed capacitor then have an external electrode applied thereto, such as a silver paint or the like. In past years, the application of external silver electrodes was done by hand, such as a hand dipping process. If the capacitors had a generally rectangular shape, it was immediately obvious which ends were to have silver terminals applied thereto. However, in the case of a square capacitor, some method of marking has been required to identify which edges of the capacitor the internal electrodes were terminating out of.

As the industry converted to automatic silvering equipment, the problem of silvering square ceramic chips became more acute, since automatic orientation of a square chip is extremely difficult. It has been found that the length to width ratio must be approximately 1.25 to permit the use of automatic orientation for automatic silvering processes. Therefore, square shaped ceramic chips must still be silvered by hand. In order to eliminate this expensive and time-consuming hand operation, square or nearly square chips have been redesigned to be of a rectangular shape so as to facilitate automatic silvering operations. However, this practice reduces the available capacitance of the unit by an amount nearly proportional to the reduction of the area of the chip. For example, a chip having dimensions of 0.300" × 0.300", is made rectangular by changing the dimensions to 0.300" × 0.240", thereby permitting it to be used in automatic silvering equipment. The area of the chip has been reduced by 20 percent and the maximum capacitance available has been reduced by approximately the same amount.

Accordingly, an object of this invention is to provide a monolithic ceramic chip that can be silvered through automatic equipment without an accompanying reduction in the capacitance of the unit.

It is another object of the present invention to provide a monolythic ceramic capacitor having its internal electrodes terminating to opposite corners of the capacitor.

It is a further object of this invention to completely eliminate the need for capacitor chip orientation on being processed through automatic silvering equipment, while producing silvered chips that are physically and electrically identical regardless of prior orientation.

It is a still further object of the present invention to provide a square shaped ceramic capacitor that does not have to be oriented before processing through automatic silvering equipment.

SUMMARY OF THE INVENTION

The internal electrodes of a monolithic ceramic capacitor are made to terminate out of opposite corners of the unit to facilitate the application thereto of external silver electrodes by automatic silvering equipment. Capacitors having this structure can be silvered in either of the two possible orientations while maintaining the same physical and electrical identities in either case. This structure therefore permits the automatic silvering of chips having a generally square shape, which heretofore have been silvered by hand because of the orientation problems created by the automatic silvering equipment.

DESCRIPTION OF THE PREFERRED EMBODIMENT

Figure 1:
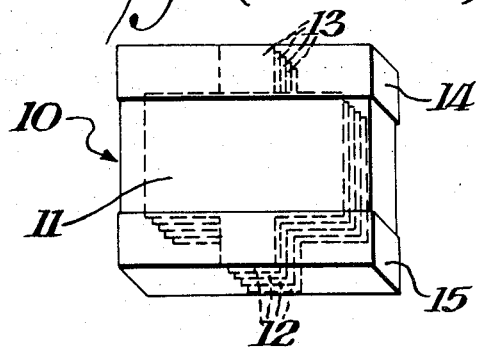
FIG. 1 shows a perspective view of a prior art monolithic ceramic capacitor having standard internal electrode terminations.

A prior art monolithic ceramic capacitor 10 is shown in FIG. 1. The capacitor 10 is made up of a plurality of layers of a dielectric ceramic 11 interleaved by internal conductive metal electrode layers that alternately terminate at opposite edges of the capacitor as shown at 12 and 13. External silver electrodes 14 and 15 are applied to the capacitor 10 on the only possible contacting edges of the capacitor unit — those opposite edges from which the internal electrodes 12 and 13 are terminating out of. When the capacitor chips 10 have square dimensions, the application of the external silver electrodes 14 and 15 by automatic equipment becomes a major problem because of the inability of the chips to be automatically oriented prior to silvering.

Figure 2:
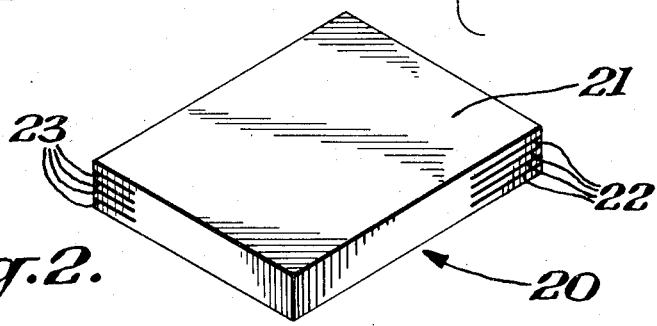
FIG. 2 is a perspective view of a monolithic capacitor of this invention having corner terminations.

FIG. 2 of the drawings shows a monolithic ceramic capacitor 20 of this invention that overcomes the above-mentioned prior art problem. The capacitor 20 is composed of a plurality of layers of a ceramic dielectric material 21 interleaved by conductive metal internal electrodes that alternately terminate out from opposing corners of the capacitor 20 as shown at 22 and 23.

Figure 3:
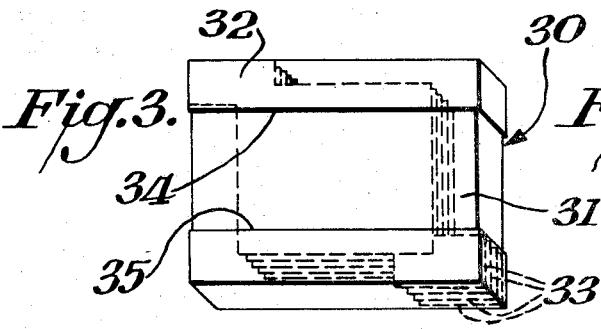
FIGS. 3 and 4 are perspective views of corner terminated monolithic capacitors of FIG. 2 that are silvered in each of the two possible orientations.
Figure 4:
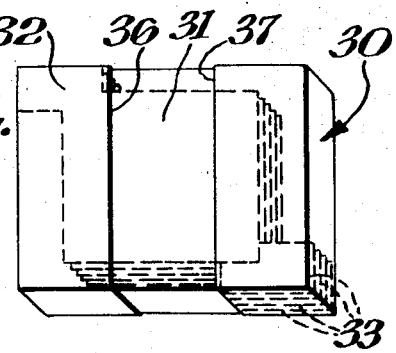

By having the internal electrodes terminating out of opposing corners of the capacitor, it becomes possible to process square shaped monolithic capacitors through automatic silvering equipment without first having to orient the capacitor. This is easily shown in FIGS. 3 and 4, where a monolithic capacitor 30, made of a ceramic material 31, has internal metal electrodes therein terminating from opposing corners of the unit. FIG. 3 has silver paint applied to the opposing "top" and "bottom" portions of the capacitor as shown by 34 and 35, while covering and contacting the internal electrode terminations 32 and 33. FIG. 4 has a silver paint applied to the opposing "side" portions of the capacitor as shown by 36 and 37, while also contacting and covering the internal electrode terminations 32 and 33.

So it becomes apparent that by having the internal electrodes terminating out of opposing corners of the capacitor, orientation of a capacitor, including a square shaped capacitor, is no longer of any consequence in the automatic silvering operation. Square shaped ceramic capacitor chips can simply be fed into the automatic silvering equipment, and any two opposing sides silvered will efficiently form the external electrodes for the capacitor.

Figure 5:
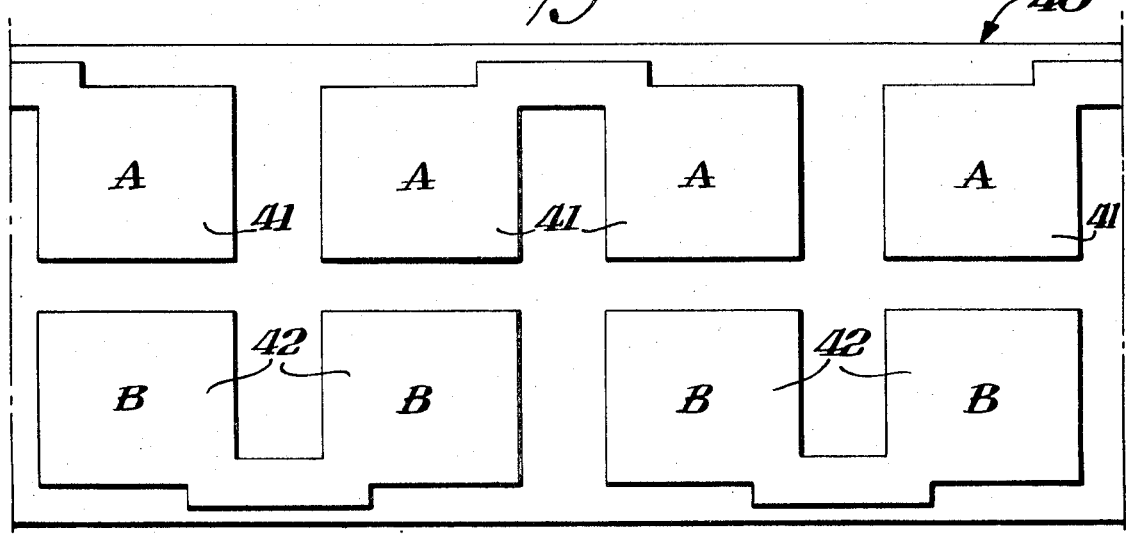
FIG. 5 is a plan view of the electrode pattern to be used in forming the stacked capacitor of this invention.

FIG. 5 shows a design pattern screen 40 for producing corner terminating internal electrodes in a monolithic capacitor. Two squares interconnected at the "top" thereof are shown by 41, while two identically shaped squares 42, interconnected at the "bottom" thereof, are designed to be offset to one side so that each of the interconnected squares B at 42 is directly under a disconnected square A of 41. This design results in opposite corner terminations lying alternately over each other. The overall dimensions of the electrode squares should be slightly smaller than the layers of dielectric base material as well as the overall dimensions of the chip formed, so that in each capacitor unit produced the only portions of the internal electrodes exposed for outside contacting will be at the opposing corners thereof.

Any process known to those skilled in the art may then be used to form a stacked unit. For example, a wet process may be used wherein a plurality of electrodes is screened on an unfired ceramic sheet using the design pattern 40 just described above. A dielectric layer (in paint form) is then deposited over the entire sheet and is dried. The design pattern screen 40 is then shifted up and down so that portion A falls precisely over portion B on the sheet. This process is then continued until the desired number of layers is achieved. The finished stack is diced into individual units by any convenient technique known to those skilled in the art and are then fired in the temperature range of 975° – 1450°C.

Figure 6:
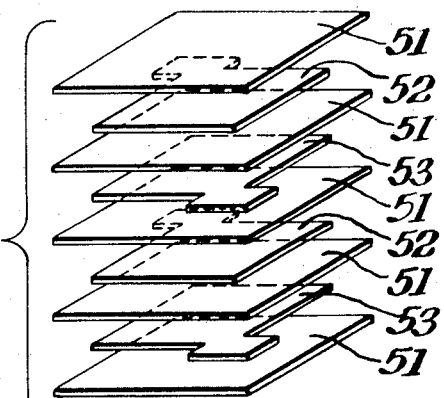
FIG. 6 is an exploded view of a monolithic capacitor utilizing the internal electrode structure of this invention.

The monolithic capacitor formed herein, and shown in FIG. 6, consists of alternate layers of a generally square shaped ceramic dielectric material 51 interleaved by internal metal electrodes 52 and 53 that alternately terminate out from opposing corners of the unit. This stacking operation is, of course, continued until the desired number of interleaved electrodes have been deposited therein. A final outer layer or coat of ceramic dielectric material is deposited thereon to complete the assembly operation. These formed units are bonded together, as by firing, and can subsequently be fed into automatic metallizing equipment to have external electrodes applied thereon. Regardless of which two opposing sides of the capacitor are silvered, the finished units will be physically and electrically identical.

The dielectric material used to form this capacitor can advantageously be of a ceramic titanate or the like. The internal electrodes can be of any conductive metal, such as silver, gold, platinum, palladium and mixtures or alloys thereof. The external electrode can be of any electrically conductive material such as a silver metallizing paint, or the like.

The above-described specific embodiments of the invention have been set forth for the purposes of illustration. It will be apparent to those skilled in the art that various modifications may be made in the composition of the monolithic capacitor without departing from the principles of this invention as pointed out and disclosed herein. For that reason, it is not intended that the invention should be limited other than by the scope of the appended claims.

What is claimed is:

1. A monolithic capacitor having corner internal electrode terminations comprising a plurality of generally square shaped dielectric layers, at least two internal electrodes interleaved between said dielectric layers and substantially covered thereby, each of said electrodes having a terminal portion extending to both edges of a corner of said dielectric layers, alternate of said terminal portions extending at diagonally opposite corners of said dielectric layers, and a pair of external electrodes each contacting an opposite edge of said dielectric layers and contacting at least one of the edges of said internal electrodes extending at one of said opposite corners.

2. The monolithic capacitor of claim 1 wherein said dielectric material is a ceramic; and said external electrodes are silver.

3. The monolithic capacitor of claim 2 wherein said ceramic is a titanate.

4. A monolithic capacitor having corner internal electrode terminations comprising: a plurality of generally square shaped layers of a ceramic titanate; a plurality of internal electrodes interleaved between said ceramic layers, said internal electrodes being substantially covered by said ceramic layers while alternately terminating from opposite corners of said capacitor; and an external silver electrode on one end of the capacitor in contact with said internal electrodes terminating therefrom, and another external silver electrode on the opposite end of said capacitor in contact with said internal electrodes terminating therefrom each of the external electrodes contact an opposite edge of said ceramic layers.

* * * * *